UNITED STATES PATENT OFFICE.

HEINRICH AUGUST BERNTHSEN, OF MANNHEIM, ASSIGNOR TO THE BADISCHE ANILIN AND SODA FABRIK, OF LUDWIGSHAFEN, GERMANY.

RED DYE.

SPECIFICATION forming part of Letters Patent No. 516,584, dated March 13, 1894.

Application filed June 12, 1893. Serial No. 477,318. (Specimens.)

*To all whom it may concern:*

Be it known that I, HEINRICH AUGUST BERNTHSEN, professor of chemistry, doctor of philosophy, and a subject of the King of Prussia, residing at Mannheim, Germany, have invented new and useful Improvements in the Manufacture of a New Red Dye-Stuff, of which the following is a specification.

My present invention is based upon the observation that the dialkylized rhodamins are capable of being easily converted into dialkyl-rhodamin-alkyl-esters thus producing useful red coloring-matters for dyeing cotton mordanted with tannin and tartar emetic, as well as for dyeing wool and silk without a mordant.

The introduction of the alkyl-group into the symmetrical dialkyl-rhodamins can be easily effected by the action of alcohols such as especially methyl or ethyl alcohol in presence of a mineral acid-muriatic or sulfuric acid—at an ordinary or at an elevated temperature. In a like manner the same alkyl derivatives can be obtained at a higher temperature by the action of alkyl-halogen compounds such as especially chlorid of methyl or chlorid of ethyl upon the dye base dissolved in alcohol. In each case the carboxylic group only is alkylized, while the amido-groups remain unaltered. The reaction which takes place may be expressed by the following general formula:

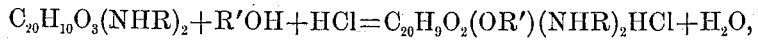

$$C_{20}H_{10}O_3(NHR)_2 + R'OH + HCl = C_{20}H_9O_2(OR')(NHR)_2HCl + H_2O,$$

where R means methyl or ethyl and R' the introduced alkyl-group especially methyl or ethyl.

In carrying out my invention practically I proceed as follows:

In a closed enameled vessel ten (10) kilos of diethyl-rhodamin (described in United States Letters Patent No. 456,081, of July 14, 1891) or nine and a half (9½) kilos of the corresponding methyl derivative are dissolved in fifty (50) kilos of ethyl alcohol and while cooling, muriatic acid gas is introduced into this solution until it is saturated. Instead of ethyl-alcohol, methyl alcohol may be used or also other alcohols such as amyl alcohol, glycerol and the like. The introduction of the alkyl-group takes place in the cold, but it is advisable to complete this operation by heating during five (5) to six (6) hours on the water-bath in a vessel provided with an inverted condenser. Instead of muriatic acid gas and the said qantity of alcohol ten (10) to fifteen (15) kilos of sulfuric acid of sixty-six degrees Baumé (66° Bé.) in admixture with about twenty (20) kilos of alcohol, may be employed without injury to the final result. After evaporation of the excess of alcohol the product of the reaction is dissolved in hot water and from the filtered solution the coloring-matter is precipitated by addition of common salt and of muriatic acid.

On dissolving and recrystallizing from water the dyestuff is obtained practically pure as a hydrochloric salt, this being its usual technical form in which it is most conveniently applied in the arts, though the soluble salts with other acids or even the free base itself can also be used if desired. It is a bronze-like crystalline powder soluble in water and alcohol with a scarlet-red color showing a greenish-yellow fluorescence. It does not dissolve in ether and benzene but it is easily soluble in concentrated muriatic acid with an orange-yellow, in concentrated sulfuric acid with a pure yellow coloration turning into scarlet-red upon dilution with water. From the aqueous solution the red colored dye-base of dialkyl-rhodamin-alkyl-ester is precipitated with alkalies in the cold; the said dye-base is soluble in benzene and ether giving yellow solutions and is also soluble in warm water. By heating the dye whether base or salt with soda lye it is easily reconverted into the dye-base of the symmetrical dialkyl-rhodamin, while the introduced alcohol radical is eliminated. The new dialkyl-rhodamin-alkyl-ester dyes yellowish-red tints, showing a greenish yellow fluorescence on wool and silk without a mordant. On cotton mordanted with tannin and tartar emetic, a magnificent red shade similar to phloxin is obtained.

The new coloring-matter not only resembles phloxin in brightness and beauty of shade, but it is even superior to it with regard to fastness against the action of light and washing. The shades of color obtained by its use are considerably bluer and stronger than those obtained with the dialkyl-rhodamins, from which it is prepared, but they are of a much yellower shade than those obtained with the well known tetra-alkyl-rhodamins.

I do not claim as my invention a trialkyl-rhodamin in which the three alkyl-groups are combined with nitrogen.

What I claim as new, and desire to secure by Letters Patent, is—

The new dye, dialkyl-rhodamin-alkyl-ester, which can be derived from dialkyl-rhodamin and which as base is soluble in benzene, ether and warm water and which in the usual commercial form of hydrochloric acid salt is a bronze-like crystalline powder soluble in water, giving a scarlet-red solution possessing a greenish-yellow fluorescence and which on treatment with a caustic alkali is converted into dialkyl-rhodamin substantially as described.

In testimony whereof I have hereunto set my hand in the presence of two subscribing witnesses.

HEINRICH AUGUST BERNTHSEN.

Witnesses:
ERNEST F. EHRHARDT,
FRIEDRICH DIETZ.